No. 895,408.  
H. T. HALLOWELL.  
SHAFT COLLAR.  
APPLICATION FILED MAR. 20, 1908.
PATENTED AUG. 4, 1908.
2 SHEETS—SHEET 1.
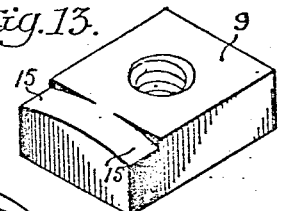
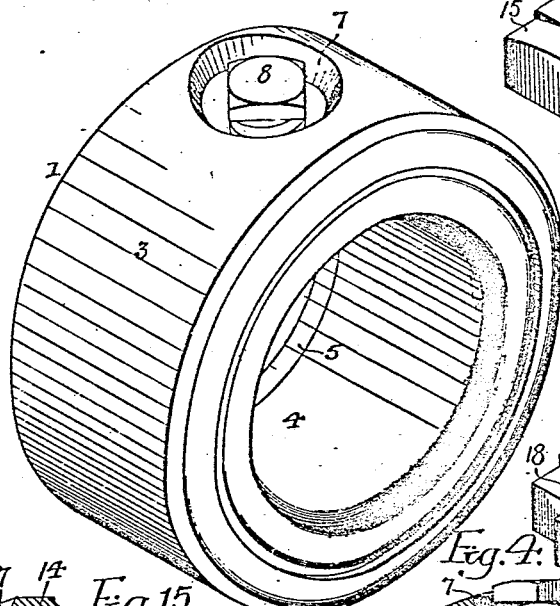
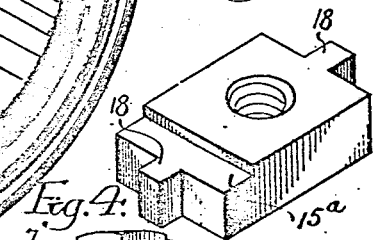
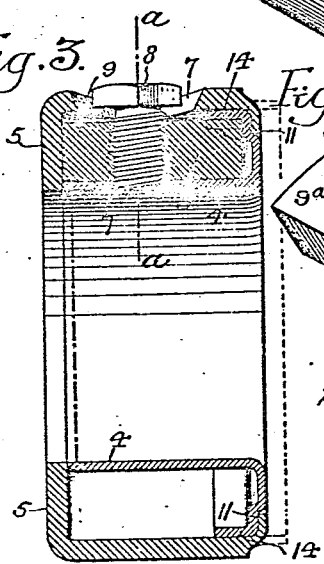
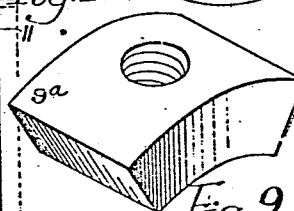
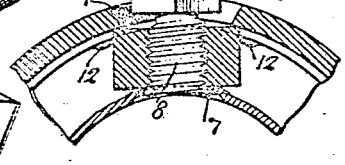
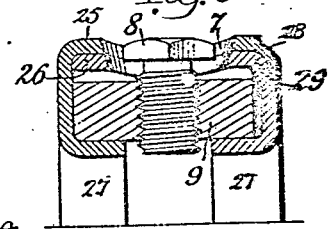
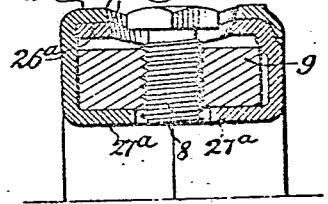
Witnesses:
Inventor:
Howard T. Hallowell
by his Attorneys
Howson & Howson No. 895,408. PATENTED AUG. 4, 1908.
H. T. HALLOWELL.
SHAFT COLLAR.
APPLICATION FILED MAR. 20, 1908.
2 SHEETS—SHEET 2.
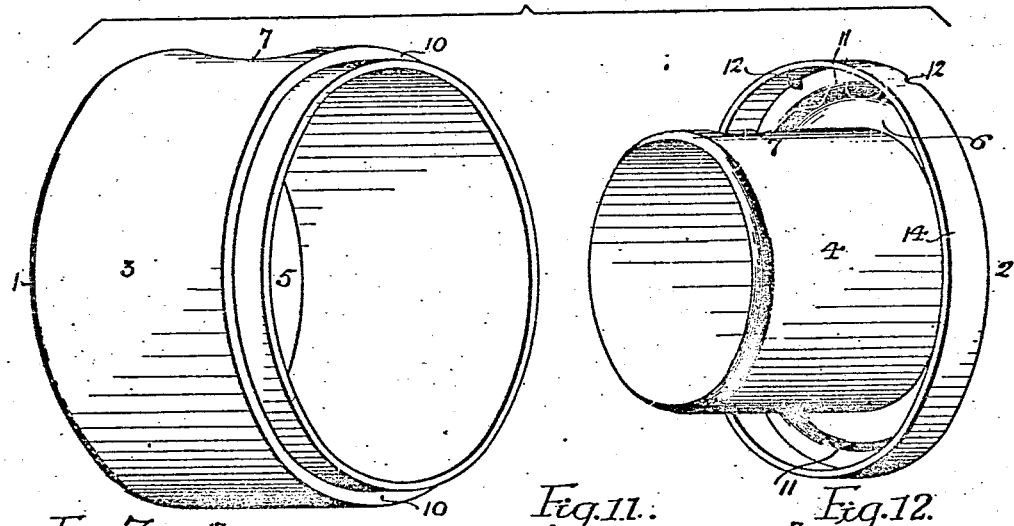
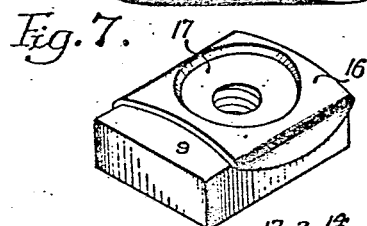
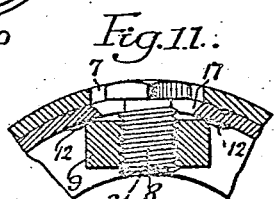
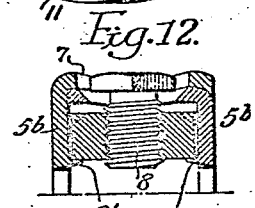
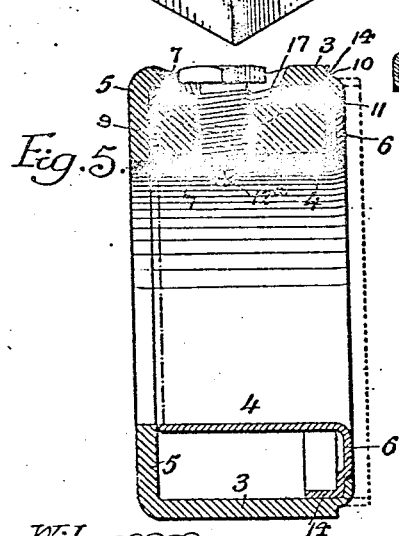
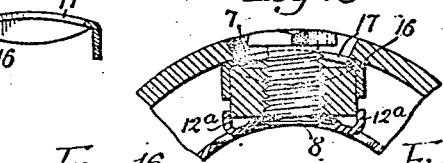
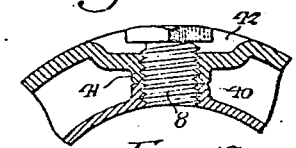
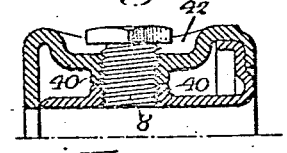

UNITED STATES PATENT OFFICE.

HOWARD T. HALLOWELL, OF PHILADELPHIA, PENNSYLVANIA, ASSIGNOR TO STANDARD PRESSED STEEL COMPANY, OF PHILADELPHIA, PENNSYLVANIA, A CORPORATION OF PENNSYLVANIA.

SHAFT-COLLAR.

No. 895,408.　　　Specification of Letters Patent.　　　Patented Aug. 4, 1908.

Application filed March 20, 1908. Serial No. 422,317.

*To all whom it may concern:*

Be it known that I, HOWARD T. HALLOWELL, a citizen of the United States, residing in Philadelphia, Pennsylvania, have invented certain Improvements in Shaft-Collars, of which the following is a specification.

My invention relates to the construction of an annulus, such as a shaft collar, and the object of my invention is to form a shaft collar of a plurality of sheet metal members pressed into the desired shape and so constructed as to be mutually confined together and to receive a set screw for normally retaining such annulus or collar in place upon a shaft or other similar element.

Other features of my invention are more fully referred to hereinafter, reference being had to the accompanying drawings, in which:

Figure 1, is a perspective view of one form of shaft collar embodying my invention in the fully assembled form ready for use; Fig. 2, is a perspective view of the members forming the same, prior to assembling; Fig. 3, is a vertical sectional view of the form of collar shown in Fig. 1; Fig. 4, is a fragmentary sectional view on the line a—a, Fig. 3; Figs. 5 and 6, are views similar to Figs. 3 and 4, illustrating a modified form of structure embodying my invention; Fig. 7, is a perspective view of a nut and washer employed with such form of collar; Fig. 8, is a sectional view of said washer; Figs. 9 and 10, both inclusive, are sectional views illustrating different forms of sheet metal sections combined to form collars embodying my invention; Figs. 11 and 12, illustrate further modifications embodying my invention; Figs. 13, 14 and 15, are perspective views illustrating modified forms of nuts for use in connection with various forms of collars or annuli embodying my invention; Figs. 16 and 17, are views illustrating a form of collar in which the peripheral walls of the members are tapped for the reception of the set screw; and Figs. 18, 19 and 20, are views illustrating modifications of such structure.

My present invention comprises certain improvements in the shaft collar or annulus forming the subject of my application for patent filed April 20, 1907, Serial No. 336,369, the object of my present improvements being to increase the strength of the collar; to facilitate the retention of the nut by the members forming the same, and to facilitate the manufacture of the several members and the ease of assembling the same.

All of the structures forming the subject of my invention comprise two or more members of sheet metal pressed into shape to form a hollow structure, and so disposed with relation to each other as to provide mutual connection and support; in certain instances to confine in proper relative position a suitable nut for the set screw usually employed with such collars, and in certain other instances to be tapped directly for the reception of said set screw.

The structure shown in Figs. 1, 2, 3 and 4, comprises members 1 and 2, each of said members having peripheral walls 3 and 4 and side walls 5 and 6 oppositely disposed with respect to each other, which members have been previously formed from sheet metal blanks by suitable dies. These members are provided with registering apertures 7 in their peripheral walls providing for the passage of a set screw 8, said set screw being arranged to engage a nut or other threaded support 9 which is mounted within the hollow space formed by the members 1 and 2, and confined by suitable means in proper relative position to the registering apertures of the members forming the collar. The aperture in the peripheral wall of the outer member is considerably enlarged so as to accommodate the head of the set screw.

To maintain the members 1 and 2, forming the collars in proper position with relation to each other, I reduce the edge of the peripheral wall 3 of the member 1 as indicated at 10 in Fig. 2, and turn down said reduced portion against the side wall 6 of the section 2, as clearly indicated in Figs. 1 and 2, said latter wall being offset at its margin as indicated at 11 to receive the turned over part; such action binding the members together and holding them against displacement. If desired, the members may be brazed, electrically welded or otherwise permanently secured together, in addition to the provision for engagement just noted. The nut or support 9, through which the set screw 8 passes, is laid adjacent the members forming the collar during the process of finally securing the same together, and to retain this nut in place against dislodgment or rattling, I may provide various means, such for instance as displacing the metal of the inner member of the collar as clearly shown at 12 in Figs. 2, 3 and 4, or at 12ª in Figs. 5 and 6, of the drawings, which may be done by means of a suitable tool. In addition, the peripheral wall of the inner member is provided with a boss 13 surrounding its aperture 7 and forming a flat seat for the nut.

The inner member 2 forming a part of the collar has an annular flange 14 which fits the inner surface of the peripheral wall of the outer member, and in Figs. 2, 3 and 4, the nut is shown as held by the displacement of metal adjacent to or forming part of said flange. The use of the flange with the nut in engagement therewith leaves a considerable space between such nut and the inner surface of the peripheral wall of the outer member, and to fill the same, I may provide a nut of the type shown in Fig. 13, having a reduced portion 15 formed on the arc of a circle for engagement by said flange 14 of the inner member; such nut being shown in position in Figs. 3 and 4. In lieu of using this form of nut, I may employ a plain nut and provide a spacing member or washer such as indicated at 16, in Figs. 5, 6, 7 and 8, to fill the space between the margin of the flange 14 and the side wall of the outer member. This spacing member is apertured at 17 and underlies the enlarged aperture 7 in the wall of the outer member. In this instance, the nut is held in position against lateral movement by displacing a portion of the metal of the peripheral wall of the inner member as shown at 12ª, in Figs. 5 and 6. The construction of such structure is otherwise similar to that shown in Figs. 1 and 2, except for the employment of the spacing member. Instead of positioning the nut by the use of a spacing member, I may provide one with spuds or projections 18 as indicated in Fig. 14, whereby it may be riveted to the side walls of the inner and outer members forming the collar. This nut is reduced at 15ª to accommodate the flange 14.

The nuts which I propose to employ in connection with my improved form of shaft collar are tapped out of center in order that they may have a sufficient portion of their body disposed beyond the flange 14 of the inner member forming part of the shaft collar. The nut, it will be noted, is so positioned as to engage the inner surface of said flange 14 and also bear against the inner surface of the peripheral wall of the outer member which is made of much heavier metal. With this arrangement, the greatest amount of strain is brought against the right-angled bend of the outer member, thereby relieving the strain which would otherwise be transmitted to the flange 14 of the inner member, which member I prefer to make of very thin metal, as indicated. In fact, this inner member is employed principally to fill out the structure and to serve as one means of preventing radial displacement of the nut. If desired, the nuts may be oblong in order to bring the edges of their long sides closer to the wall of the outer member.

A further feature of tapping the nuts out of center, is that when counterboring or enlarging the aperture in the wall of the outer member, I am obliged to cut almost clear across this wall to accommodate the head of the set screw, and if the nut were centrally bored, it would bring the aperture closer to the margin of the peripheral wall of the outer member and greatly limit the strength of the same at that point.

It will, of course, be understood by those skilled in the art that minor changes in the construction of my improved shaft collar may be made without departing from my invention. For instance, if desired, instead of tapping the nuts out of center, I may provide narrow nuts centrally tapped and somewhat longer than those shown and bend them in the arc of a circle so as to fit the space formed between the inner and outer members forming the shaft collar, such, for instance, as shown at 9ª in Fig. 15. In this event, the wall of the inner shell need not overlap the nut, for the latter being bent to the arc of curvature of the members, the outer peripheral wall will be sufficiently stiff to resist the pull of the set screw. Such nut will be retained in place in the usual manner by displacing against the same a portion of the metal of one of the members of the collar.

Figs. 9 and 10, illustrate various forms of shaft collars of different cross-sectional contour embodying my invention, which collars are held in the assembled form by the turning over of a portion of one of the sections comprising the same with respect to the other, such turned over portion having been previously reduced to facilitate such action.

Fig. 9, shows a collar made of the members 25 and 26 which are substantially J-shape in cross section, each having inturned flanges 27. These sections are secured together by reducing the margin 28 of the section 25 and turning it down over the offset edge 29 of the section 26. The nut 9 is employed in connection with this structure in the manner shown, and the peripheral walls 25 and 26 are apertured at 7 for the passage of the set screw and counterbored to accommodate the head of the same.

Fig. 10, shows a structure somewhat similar to that shown in Fig. 9, having members 25ª and 26ª of substantially the same shape and retained in the same manner, the difference being that the flanges 27ª form a complete inner peripheral wall by abutting on a substantially central line. The nut 9 is employed in connection with this structure in the same manner as with that shown in Fig. 9.

In Figs. 11 and 12, I have shown a form of collar made of L-shaped members, in which the inner wall is omitted, the peripheral walls of said members lying against each other and forming the outer wall of the collar. The nut 9 is retained against lateral displacement between the side walls of the structure by displacing a portion of the peripheral wall of the inner member in the manner already described and as indicated at 12, and held against radial movement by offsetting a portion of the side walls 5ᵇ to rest beneath said nut as indicated at 31.

In completing the annulus or shaft collar, the members of the same are assembled in a suitable manner; the nut being properly positioned and maintained in such position by means of the set screw, or a suitable pin, which is passed through the apertures of the several members and then said members are subjected to pressure while confined between suitable dies whereby the securing means, such as compressing the metal of one member with respect to the other, are applied, and the members forming the annulus or collar are thereby locked against displacement. Before removing the set screw or pin, the nut is confined in place by displacing the metal of the members relatively thereto, or immediately after removing the completed collar from the press, or if desired the metal of the one section to hold such nut may be displaced before the members are secured together.

I may, if desired, braze or electrically weld any and all of the abutting faces of the several forms of structures shown herein, and if this is done, the members will have the necessary contact points, and I may further harden the side wall or face of the respective collars which comes opposite the work.

It will be noted that the outer member of the form of collar shown in Figs. 1, 2, 3, &c., is much heavier than the inner member and that the flange of the inner member overlies the nut and is disposed between the same and the outer shell. This construction is especially strong; the tendency of the nut to be forced outwardly when the screw is turned down against the shaft being fully resisted by the walls with which the nut contacts.

I further found that when using an outer member for the shaft collar having a shell of ample thickness, that it is possible to form a cup in the wall of the same which may be tapped to receive a set screw and thereby obviate the necessity of employing a nut, and such structure I have shown in Figs. 16, 17, 18, 19 and 20.

In the structure shown in Figs. 16 and 17, a portion of the peripheral walls of the inner and outer members are drawn into cup form, as indicated at 40 and 41, respectively, at a point substantially midway between their sides or margins, and these cupped portions are afterwards bored and threaded to receive the set screw; the wall of the outer member being further countersunk or depressed at 41 to accommodate the head of said set screw. In the form of structure shown in Fig. 18, the inner member is cupped and bored at 40, and in the form shown in Fig. 19, the outer member is cupped and bored at 41. In these latter instances, the uncupped member is simply apertured for the passage of the set screw.

In the structure shown in Fig. 20, the peripheral wall of the inner member as well as the peripheral wall of the outer member are both cupped as at 40 and 41, then bored and threaded, and by preference the edge of one of these cupped and threaded portions is provided with a beveled seat 42 for the reception of the end 41 of the other member, beveled accordingly. Other arrangements providing for the threading of a portion of the shell for the reception of the nut may be provided for without departing from my invention. When employing structures of this character, the members forming the collar may be secured together in any of the manners hereinbefore described, or I may employ a structure having provision for reception of two set screws, the presence of which will render unnecessary any other means of securing the members forming the shaft collar. It will be understood, of course, that the integral threaded portion of the collar for the reception of a screw may be made in connection with any of the forms of collar illustrated in the several cross sectional views.

In finally assembling the members forming the shaft collar, the bottom of the cup forming the inner member is still in place, as shown by the broken line in Figs. 3 and 5. After the portion of the peripheral wall of the outer member is turned down securing the two members together, this bottom is cut out, leaving the structure as shown by the full lines, ready to be placed upon a shaft.

The displacing of the metal in one of the peripheral walls of the structure serves to locate the nut in line with the apertures in said peripheral wall or walls, but cannot serve to firmly fix said nut in place, inasmuch as there must be sufficient room to permit free insertion of said nut. It is desirable, of course, to prevent any rattling of the nut in the finished collar, and to accomplish this the finished collar is placed in a die and a depression 13 formed in the inner peripheral wall adjacent the aperture for the passage of the set screw, as indicated in the drawings. By this means a seat is formed for the nut, and the latter is held firmly between the same and the displaced portions of the peripheral wall as indicated.

I claim:

1. A hollow sheet metal annulus or collar for shafts, comprising inner and outer members forming a hollow annular space, each of said members having a peripheral wall and a side wall integral therewith, one of said peripheral walls being reduced at its edge and turned down against the side wall of the other member whereby said members may be retained in rigid relationship, and an internally threaded element confined in the hollow space formed by said members, said peripheral walls being apertured in line with the opening in said threaded member.

2. A hollow sheet metal annulus or collar for shafts, comprising inner and outer members forming a hollow annular space, each of said members having a peripheral wall and a side wall integral therewith, the walls of the outer member being considerably heavier than those of the inner member and the peripheral wall of the outer member being reduced at its edge and turned down against the side wall of the other member whereby said members may be retained in rigid relationship, and an internally threaded element confined in the hollow space formed by said members, said peripheral walls being apertured in line with the opening in said threaded member.

3. A hollow sheet metal annulus or collar for shafts, comprising inner and outer members substantially L-shaped in cross section and forming a hollow annular space, each of said members having a peripheral wall and a side wall integral therewith, the walls of the outer member being considerably heavier than those of the inner member and the peripheral wall of the outer member being reduced at its edge and turned down against the side wall of the inner member whereby said members may be retained in rigid relationship, and an internally threaded element confined in the hollow space formed by said members, said peripheral walls being apertured in line with the opening in said threaded member.

4. The combination, in a shaft collar, of a pair of members each having peripheral walls and side walls integral therewith, means for maintaining said members in proper relationship and securing them together so as to form a hollow closed space, one of said members having a flange, and a nut disposed in said hollow space and bearing against said flange.

5. The combination, in a shaft collar, of inner and outer members each having a peripheral wall and a side wall integral therewith, the outer member having thicker walls than the inner member, means for maintaining said members in proper relationship and securing them together to form a hollow space, one of said sections having a flange, and a nut disposed in said hollow space, said nut bearing against the outer member and the flange of the inner member.

6. A shaft collar comprising inner and outer members each having a peripheral wall or flange and a side wall at right angles thereto and integral therewith forming an annular space, a set-screw, and means carried by said collar within said space for the reception of said set screw, the outer peripheral wall of said collar being constructed for the reception of the head of said screw, and means integral with one of the members for holding the means within the annular space in place.

7. A shaft collar comprising inner and outer members each having a peripheral wall or flange and a side wall at right angles thereto and integral therewith forming an annular space, the walls of one of said members being greater in thickness than the walls of the other member, a set screw, and means carried by said collar for the reception of a set screw, the outer peripheral wall of said collar being constructed for the reception of the head of said set screw, and means integral with one of the members for holding the means within said space in place.

8. A hollow sheet metal annulus or collar for shafts comprising disk-like members each having a flange and together forming a hollow annular space, a nut located within said space, and means carried by one of the members for retaining said nut in proper position, the flange of the other member having a seat for said nut which serves with the retaining means to firmly bind said nut in place.

9. A hollow sheet metal annulus or collar for shafts comprising members having side walls and inner and outer peripheral walls forming a hollow space, a nut located within said space, and a set screw for said nut, one of said members having a seat for retaining the nut in proper position, and the peripheral walls having apertures in line with the opening of said nut and one of them being counterbored to accommodate the head of the set screw.

10. The combination, in a shaft collar or annulus of sheet metal, of inner and outer members having integral peripheral and side walls, said inner member having a flange lying against the peripheral wall of the outer member, a nut disposed within the space formed by said members, and a set screw for said nut, said nut having a portion of its surface rounded to receive the flange of the inner member.

11. The combination, in a shaft collar or annulus of sheet metal, of inner and outer members having integral peripheral and side walls, said inner member having a flange lying against the peripheral wall of the outer member, a nut disposed within the space formed by said members, and a set screw for said nut, said nut being tapped out of center and having a portion of its surface rounded to receive the flange of the inner member.

12. In a sheet metal shaft collar, an inner member having a cylindrical portion conforming to the shaft and a side or wall integral therewith extending outwardly at a right angle therefrom, a set screw said shaft conforming portion being apertured for the passage of said set screw, and the outwardly extending side or wall having a flange disposed concentrically with respect to said shaft conforming portion.

13. A hollow sheet metal collar for shafts comprising a pair of L-shaped members, one of said members forming an outer peripheral wall and a side wall, while the other forms a shaft fitting sleeve and a side wall, the outer edge of the side wall of said last mentioned member being flanged to form a second peripheral wall lying against the first, a threaded element confined within the hollow annular space formed by said members, and means for securing said members together.

14. A hollow sheet metal collar for shafts comprising a pair of L-shaped members, one of said members forming an outer peripheral wall and a side wall, while the others form a shaft fitting sleeve and a side wall, the outer edge of the side wall of said last mentioned member being flanged to form a second peripheral wall lying against the first, a threaded element confined within the space formed by said members, and means integral with said first mentioned peripheral wall for firmly binding said L-shaped members together.

15. A shaft collar of sheet metal comprising a pair of members, one consisting of an outer integral side and peripheral wall, and the other consisting of an inner integral peripheral and side wall, said members being suitably secured together and said peripheral walls being apertured, a nut confined within the hollow annular space formed by said walls, and a set screw for said nut, the apertured portion of the outer peripheral wall being of sufficient size to accommodate the head of the set screw.

16. A shaft collar of sheet metal comprising a pair of members, one consisting of an outer integral side wall and peripheral wall, and the other consisting of an inner integral peripheral wall and side wall, said members being suitably secured together and said peripheral walls being apertured, a nut confined within the hollow annular space formed by said walls, and a set screw for said nut, the apertured portion of the outer peripheral wall being of sufficient size to accommodate the head of the set screw, said members having integral projections for holding said nut rigidly in position in line with said apertures.

17. A shaft collar of sheet metal comprising a pair of members, one consisting of an outer integral side and peripheral wall, and the other consisting of an inner integral peripheral and side wall, said members being suitably secured together and said peripheral walls being apertured, a nut confined between said walls, a set screw for said nut, the apertured portion of the outer peripheral wall being of sufficient size to accommodate the head of the set screw, and means integral with said outer peripheral wall for retaining said inner peripheral and side wall rigidly in position with relation thereto.

18. A shaft collar of sheet metal comprising a pair of members, one having an outer integral side and peripheral wall, and the other having an inner integral peripheral and side wall, said members being suitably secured together and said peripheral walls being apertured, a nut confined in the space between said walls, and a set screw for said nut, the apertured portion of the outer peripheral wall being of sufficient size to accommodate the head of the set screw, means integral with said outer peripheral wall for retaining said inner peripheral and side wall rigidly in position, said members having integral projections for holding said nut rigidly in position in line with said apertures.

19. A sheet metal shaft collar comprising a pair of L-shaped members each having a side wall and a flange at right angles thereto, means for holding said members together, a nut disposed between the side walls of said structure, said L-shaped members having integral portions for retaining said nut in place, and a set screw for said nut, the peripheral wall of the collar being constructed for the reception of the head of said set screw.

20. The combination, in a shaft collar or annulus of sheet metal, of inner and outer members having integral peripheral and side walls, said inner member having a flange lying against the peripheral wall of the outer member, a nut disposed within the space formed by said members, and a set screw for said nut, said nut having a portion of its surface reduced to receive the flange of the inner member.

21. The combination, in a shaft collar or annulus of sheet metal, of inner and outer members having integral peripheral and side walls, said inner member having a flange lying against the peripheral wall of the outer casing, a nut disposed within the space formed by said members, and a set screw for said nut; said nut being tapped out of center and having a portion of its surface reduced to receive the flange of the inner member.

In testimony whereof, I have signed my name to this specification, in the presence of two subscribing witnesses.

HOWARD T. HALLOWELL.

Witnesses:
MURRAY C. BOYER,
WM. A. BARR.